United States Patent
Achenbach et al.

(10) Patent No.: US 10,640,301 B2
(45) Date of Patent: May 5, 2020

(54) CONVEYOR BELT SYSTEM

(71) Applicant: Multivac Sepp Haggenmüller SE & Co. KG, Wolfertschwenden (DE)

(72) Inventors: Manfred Achenbach, Biedenkopf (DE); Norbert Wörz, Erkheim (DE); Konrad Mößnang, Kempten (DE); Robert Maier, Babenhausen (DE)

(73) Assignee: Multivac Sepp Haggenmüller SE & Co. KG, Wolfertschwenden (DE)

( * ) Notice: Subject to any disclaimer, the term of this patent is extended or adjusted under 35 U.S.C. 154(b) by 0 days.

(21) Appl. No.: 16/355,213

(22) Filed: Mar. 15, 2019

(65) Prior Publication Data

US 2019/0283977 A1    Sep. 19, 2019

(30) Foreign Application Priority Data

Mar. 16, 2018 (DE) .................. 10 2018 204 031

(51) Int. Cl.

| | | |
|---|---|---|
| *B65G 47/31* | (2006.01) | |
| *B65G 47/00* | (2006.01) | |
| *B65G 47/22* | (2006.01) | |
| *B65G 47/26* | (2006.01) | |
| *B65B 9/04* | (2006.01) | |
| *B65B 35/44* | (2006.01) | |

(Continued)

(52) U.S. Cl.
CPC .............. *B65G 47/31* (2013.01); *B65B 9/04* (2013.01); *B65B 25/06* (2013.01); *B65B 35/44* (2013.01); *B65G 47/22* (2013.01); *B65G 47/26* (2013.01); *B65G 47/71* (2013.01); *B65G 47/715* (2013.01); *B65G 2201/0202* (2013.01)

(58) Field of Classification Search
None
See application file for complete search history.

(56) References Cited

U.S. PATENT DOCUMENTS

| 5,209,339 A | * | 5/1993 | Antonissen | ............ B65G 43/08 198/419.1 |
|---|---|---|---|---|
| 5,317,859 A | * | 6/1994 | Schneider | ............... B65B 5/106 53/251 |
| 8,689,965 B2 | * | 4/2014 | Sjogren | ................... B65B 35/24 198/415 |

FOREIGN PATENT DOCUMENTS

| DE | 102010053872 A1 | 6/2012 |
|---|---|---|
| DE | 102015121546 A1 | 6/2017 |

(Continued)

*Primary Examiner* — Kavel Singh
(74) *Attorney, Agent, or Firm* — Husch Blackwell LLP

(57) ABSTRACT

A conveyor belt system for forming a predetermined arrangement of a plurality of products (provided to the conveyor individually or in respective groups) that are intended for an infeed process on a packaging machine. The plurality of products may be oriented in a row transversely to the conveying direction. The conveyor belt system may include a distributing belt module that takes up products from an upstream positioned product provider, a buffer belt module arranged downstream of the distributing belt module and configured to convey in a plurality of tracks extending side by side along the conveying direction a respective plurality of products one after the other, and an orienting belt module that can position the products in at least one row transversely oriented to the conveying direction according to the predetermined arrangement, the orienting belt module being positioned downstream of the buffer belt module in the conveying direction.

13 Claims, 4 Drawing Sheets

(51) Int. Cl.
  *B65B 25/06* (2006.01)
  *B65G 47/71* (2006.01)

(56) References Cited

FOREIGN PATENT DOCUMENTS

EP 2030898 A1 3/2009
GB 2098955 A 12/1982

* cited by examiner

CONVEYOR BELT SYSTEM

CROSS-REFERENCE TO RELATED APPLICATIONS

This application claims priority to German Patent Application No. 10 2018 204 031.1 filed on Mar. 16, 2018 to Manfred Achenbach, Norbert Worz, Konrad MoBnang and Robert Maier, currently pending, the entire disclosure of which is incorporated herein by reference.

FIELD OF THE INVENTION

The present invention relates to a conveyor belt system.

BACKGROUND OF THE INVENTION

In practice, loading lines are known, in the case of which products, such as shingled sausage or cheese slices, are fed into thermoformed troughs provided on a thermoform packaging machine. The products are here transferred from a slicer to a feed belt system, whereupon the products are conveyed along a conveying line on a plurality of conveyor belt segments, which are arranged one after the other in the conveying direction, up to an infeed station of the thermoform packaging machine.

It is known from practice that the products continuously provided by the slicer are first distributed onto conveying tracks by means of a distributing belt belonging to the feed belt system. Immediately afterwards, a plurality of products is oriented on a conveyor belt downstream of the distributing belt according to a product row arranged transversely to the conveying direction. The product rows oriented transversely to the conveying direction are then conveyed by means of a plurality of successively positioned buffer belts and, further downstream, they are fed at an infeed station of the thermoform packaging machine into the respective packaging troughs provided there.

For the known conveying process, the conventional feed belt system comprises, successively when seen in the conveying direction, the following conveyor belt arrangement starting at the slicer and extending up to the infeed station of the thermoform packaging machine: distributing belt, orienting belt, buffer belts and infeed belt. This kind of arrangement is schematically shown in FIG. 1.

In the known arrangement, the orienting belt must be as short as possible, since products are continuously fed thereto via the distributing belt from the slicer, which is positioned further up-stream. In order to be able to cope with the product quantity produced by the slicer, only one transverse row of products is therefore produced on the orienting belt at a time. In view of the fact that the known orienting belt, arranged directly downstream of the distributing belt in the conveying direction and used for establishing a transverse row of the products arriving thereon, comprises a plurality of separately controllable orienting belts with short dimensions, which are juxtaposed when seen in the conveying direction, the orienting belt is structurally difficult to manufacture. In addition, a plurality of products can thus only be taken up on the orienting belt module in closely spaced initial formations.

An essential disadvantage has been found to be that the products, which have already been precisely oriented in transverse rows by the orienting belt, must subsequently cross a plurality of buffer belts, before they arrive at the infeed station. However, when crossing the buffer belts, which are arranged one after the other in the conveying direction, and in particular when crossing the respective intermediate transfer gaps, and even more so in the case of major speed changes, it may happen that the products, which had first been arranged precisely in transverse rows by the orienting belt, will get out of place, i.e. they will change their previously precisely oriented position. It will then not be possible to execute a precise infeed process downstream of the buffer belt section according to a predetermined product arrangement into the packaging troughs provided on the thermoforming packaging machine.

Against this background, it is the object of the present invention to improve a conveyor belt system in view of the technical problems caused by the prior art. Furthermore, it is the object of the present invention to provide a corresponding method to operate a conveyor belt system.

SUMMARY OF THE INVENTION

This object is achieved by a conveyor belt system according to the present disclosure as well as by a method for using the conveyor belt system.

The present invention relates to a conveyor belt system, configured for forming a predetermined arrangement from a plurality of products provided thereto individually or in respective groups, the products according to the predetermined arrangement being intended for an infeed process on a packaging machine.

By means of the conveyor belt system according to the present invention, a plurality of products at a time can be oriented in a row transversely to the conveying direction and can be supplied precisely to the infeed process according to this arrangement.

The conveyor belt system according to the present invention comprises a distributing belt module by means of which products can be taken up from an upstream positioned product provider, a buffer belt module arranged downstream of the distributing belt module and configured to convey in a plurality of tracks extending side by side along the conveying direction a respective plurality of products one after the other, and an orienting belt module controllable such that it will position the products, which have been transferred thereto, in at least one row transversely to the conveying direction according to the predetermined arrangement.

According to the present invention, the orienting belt module may be positioned further downstream than the buffer belt module, when seen in the conveying direction. This has even more than one positive technical effect.

On the one hand, this may have the positive effect that the orienting belt module, which may be arranged downstream of the buffer belt module when seen in the conveying direction, will have more time for orienting the products, which have been provided thereto, in accordance with the predetermined arrangement, i.e. in a desired format, e.g. in a transverse row, since the products are first buffered on the upstream positioned buffer belt module. This also offers the possibility of a more versatile structural design of the orienting belt module, i.e. the possibility of getting away from the limitations resulting from a short structural design, such limitations existing in the case of the known solution. Hence, the arrangement according to the present invention offers the advantage that the orienting belt module may also be constructed such that it will be able to precisely orient not only one row, but even a plurality of rows of products one after the other.

On the other hand, the formation of a precise format on the orienting belt module, which, in comparison with the prior art, may be delayed, i.e. carried out only downstream of the product buffer belt zone, may have the advantage that the products oriented on the orienting belt module according to the predetermined arrangement can be placed more precisely into the packaging troughs provided subsequently for these products, since, after having been oriented, the products have to cross, if at all, only a small number of belt junctions downstream of the orienting belt module before the infeed process takes place.

Preferably, the buffer belt module comprises a plurality of separately controllable buffer belt sections arranged one after the other in the conveying direction, neighboring buffer belt sections being separated from one another by a transfer gap. By means of the plurality of successively arranged buffer belt sections, the products taken up thereon from the upstream positioned distributing belt module can be accumulated along the buffer belt section such that they can be supplied continuously from the buffer belt module to the orienting belt module positioned further downstream. Hence, the buffer belt module forms a reliable intermediate store from which products can continuously be transferred to the orienting belt module positioned further downstream, so that the orienting process can be executed smoothly and substantially independently of the upstream process of providing products by means of the product provider, e.g. a slicer, and the subsequent process of distributing the products by means of the distributing belt module. It follows that the products, which are first distributed, then buffered and only subsequently precisely oriented, can reliably be fed in a predetermined format to the packaging troughs provided.

According to a variant, the products intended for a row according to the predetermined arrangement are first transferred from the buffer belt module to the orienting belt module according to an initial formation arranged in a horizontal plane of projection, part of the products being possibly transferred irregularly. According to this variant, it is accepted along the buffer belt module that the products arriving thereon and advanced along the buffer belt conveying line need not be transferred to the orienting belt module according to the predetermined format, since the precise format orientation will be carried out only subsequently by means of the downstream positioned orienting belt module. It follows that higher accelerations for the respective buffer belt sections are possible. Even if, as a result, the products should slightly change their respective position, the intermediately occurring, possibly irregular initial formation can be corrected on the orienting belt module afterwards, so as to establish the predetermined arrangement of the products, i.e. the transfer format for the infeed process.

It will be of advantage, when the products intended for a plurality of rows according to the predetermined arrangement are transferred from the buffer belt module to the orienting belt module in respective initial formations, which are arranged in a similar manner one after the other in the conveying direction. In this way, even a plurality of rows can be oriented one after the other transversely to the conveying direction on the orienting belt module according to the predetermined format for the infeed process. In addition, the orienting belt module can here be used efficiently as a buffer, so that product transfer from the orienting belt module will be less dependent on an operation of the upstream positioned conveying line, in particular the conveying line of the buffer belt module.

According to a variant, the distributing belt module arranged upstream of the buffer belt module may be configured such that it transfers the products provided for the respective transverse rows and taken up from the product provider to the buffer belt module in respective initial formations arranged in a similar manner transversely to the conveying direction, e.g. in formations arranged one after the other along similar arcuate lines. This can lead to a continuous product conveying sequence, so that, along the conveying line of the buffer belt module, a high control and regulating effort will not be necessary at the respective buffer belt sections. As a result, also the subsequent correction of respective product positions on the orienting belt module can be carried out more easily.

Preferably, the orienting belt module comprises a plurality of separately accelerable orienting belts arranged side by side in the conveying direction, the respective orienting belts being accelerable such that the products placed thereon are positionable relative to one another in at least one row oriented transversely to the conveying direction according to the predetermined arrangement. The orienting belts arranged side by side are controllable independently of one another and can therefore be moved, depending on the product initial formations arriving on the orienting belt module, such that the products which are first arranged in the initial formation can be shifted precisely such that the desired formation, i.e. at least one row oriented transversely to the conveying direction, may be obtained, this being the format in which they can then be supplied e.g. to an infeed station of a thermoform packaging machine following directly downstream. The precise product orientation carried out by the orienting belts at a point downstream of the buffer belt sections can reliably be maintained until the subsequent infeed process takes place, since the precisely arranged products need no longer cross a plurality of conveying belt sections after the orienting belt module.

Preferably, a number of the orienting belts positioned side by side corresponds to a number of the tracks of products oriented in the conveying direction within the predetermined arrangement. This allows a precise format of products to be produced by means of the orienting belts positioned side by side.

According to a variant, the conveyor belt system comprises an infeed belt module arranged downstream of the orienting belt module in the conveying direction and used for filling packaging troughs provided for the infeed process. Preferably, the infeed belt module comprises a conveying belt formed integrally in the conveying direction. In this way, the products, which have already arrived on this conveying belt in the desired formation, can be prevented from shifting once more.

Preferably, the orienting belt module itself may be configured as an infeed belt for filling packaging troughs provided for the infeed process. The orienting belt module thus fulfills a dual function, since it first orients the products located thereon precisely relative to one another according to the predetermined arrangement, and, subsequently, it transfers the products to the packaging troughs provided.

According to an improved variant, the conveyor belt system comprises a discarding belt module configured for discarding the products and/or groups of products which have a predetermined property, e.g. which are insufficient in weight. Preferably, the discarding belt module may be positioned upstream of the distributing belt module, between the latter and the product provider. This allows products, which do not satisfy the target values, to be discarded at the very beginning of the product conveying line.

According to an advantageous variant, a product discarder, e.g. a picker, may be assigned to the infeed belt module or the orienting belt module configured as an infeed belt, and may be intended to remove from the product conveying flow individual products arranged outside a predetermined positional tolerance, i.e. outside the row.

Preferably, the distributing belt module comprises a plurality of distributing belts arranged side by side in the conveying direction and having conveying tracks which are controllable such that they converge or diverge. This allows sliced products, e.g. cut individual slices of meat or fish, or grouped slices, e.g. shingled, sliced sausages or cheese, provided side by side in the conveying direction at the entrance of the distributing belt module by the product provider, in particular a slicer, to be taken up in closely spaced, juxtaposed tracks and to be distributed subsequently along the conveying line of the distributing belt module in a diverging mode onto predetermined tracks, which are less closely spaced, for subsequent transfer to corresponding tracks of the buffer belt module, the track arrangement of the buffer belt module being adjusted according to the provision of packaging troughs at the infeed station. It follows that the distributing belt module can be used excellently as a coupling unit for bridging a different routing of tracks, in particular between a slicer and a buffer belt module, so as to bring the products into predetermined conveying tracks with respect to the infeed process.

The juxtaposed distributing belts may especially be positioned in a predetermined, fixed, diverging operational configuration upstream of the buffer belt module. However, it would also be imaginable that the respective distributing belts exhibit a flexibly controllable track routing, i.e. that they are controllable relative to one another such that they will be adapted to the provision of products. Preferably, the respective distributing belts are accelerable in the conveying direction such that the products are transferred from the distributing belt module to the downstream buffer belt module in the form of initial formations, which are arranged in a similar manner one after the other in the conveying direction, e.g. in the form of similar curves, so that individual products will so to speak be prearranged.

According to an expedient embodiment, the orienting belt module may have associated therewith a detection system, which may be configured for detecting the products transferred to the orienting belt module for forming a row oriented transversely to the conveying direction and constituting part of the predetermined arrangement, the orienting belt module being configured for positioning, based on values measured by the detection system, the products, which are located thereon, in at least one row transversely to the conveying direction according to the predetermined arrangement. The detection system may be preferably a sensor unit, which may be supported such that it may be positioned above the orienting belt module. The sensor unit may comprise a sensor rail having sensors secured thereto, in particular reflection sensors or light barriers for detecting the leading edge of the products or image-detecting sensors.

Preferably, a packaging machine, particularly preferred a thermoform packaging machine, may be provided with a conveyor belt system of the type described hereinbefore, the conveyor belt system being configured such that it precedes the infeed process. Preferably, the conveyor belt system according to the present invention may be configured as a top loader. This embodiment may be supported on the machine frame of the thermoform packaging machine above a trough production line.

In addition, the present invention relates to a packaging line, comprising a thermoform packaging machine with a conveyor belt system according to the present invention as well as a slicer associated with the thermoform packaging machine upstream thereof and used for producing sliced individual and/or grouped products. Products are continuously transferred from the slicer to the conveyor belt system, whereupon these products are, along the conveying line, first distributed, then accumulated and buffered, respectively, and finally oriented according to a desired format for a precise infeed process. This kind of packaging line guarantees a high packaging quality.

The present invention also relates to a method of forming a predetermined arrangement from products provided individually or in groups, wherein the products according to the predetermined arrangement are intended for an infeed process on a packaging machine, and wherein, according to the predetermined arrangement, a plurality of products may be oriented in a row transversely to the conveying direction. According to the present invention, the products are, in the course of this process, moved as follows in successive conveying sections:

along a first conveying section, the products are distributed to a plurality of predetermined tracks extending in the conveying direction, along a second conveying section, the respective products intended for a row, which may be oriented transversely to the conveying direction and which constitutes part of the predetermined arrangement, are conveyed in a plurality of initial formations that are preferably arranged in a similar manner one after the other in the conveying direction, and along a third conveying section, the respective products intended for a row, which may be oriented transversely to the conveying direction and which constitutes part of the predetermined arrangement, and provided according to the above-mentioned initial formation are accelerated relative to one another in such a way that the respective products are positioned in at least one row according to the predetermined arrangement, the row being oriented transversely to the conveying direction.

The solution according to the present invention offers substantial advantages in comparison with the known arrangement described at the beginning in the introduction to the specification. The invention provides the possibility of simultaneously transferring a plurality of products to a downstream infeed process in a functionally suitable and precise manner, so that the packaging quality will, all in all, be improved substantially by the present invention. In addition, the conveyor belt system according to the present invention may be adaptable in a flexible manner, when it cooperates with cyclically operating packaging machines, in particular thermoform packaging machines, and can be used, so to speak as an allrounder, on different types of packaging machines.

Other aspects and advantages of the present invention will be apparent from the following detailed description of the preferred embodiments and the accompanying drawing figures.

DESCRIPTION OF THE SEVERAL VIEWS OF THE DRAWINGS

In the following, an advantageous embodiment of the present invention will be explained in more detail making reference to a drawing, in which the individual figures show.

DETAILED DESCRIPTION OF THE INVENTION

Figure 1:
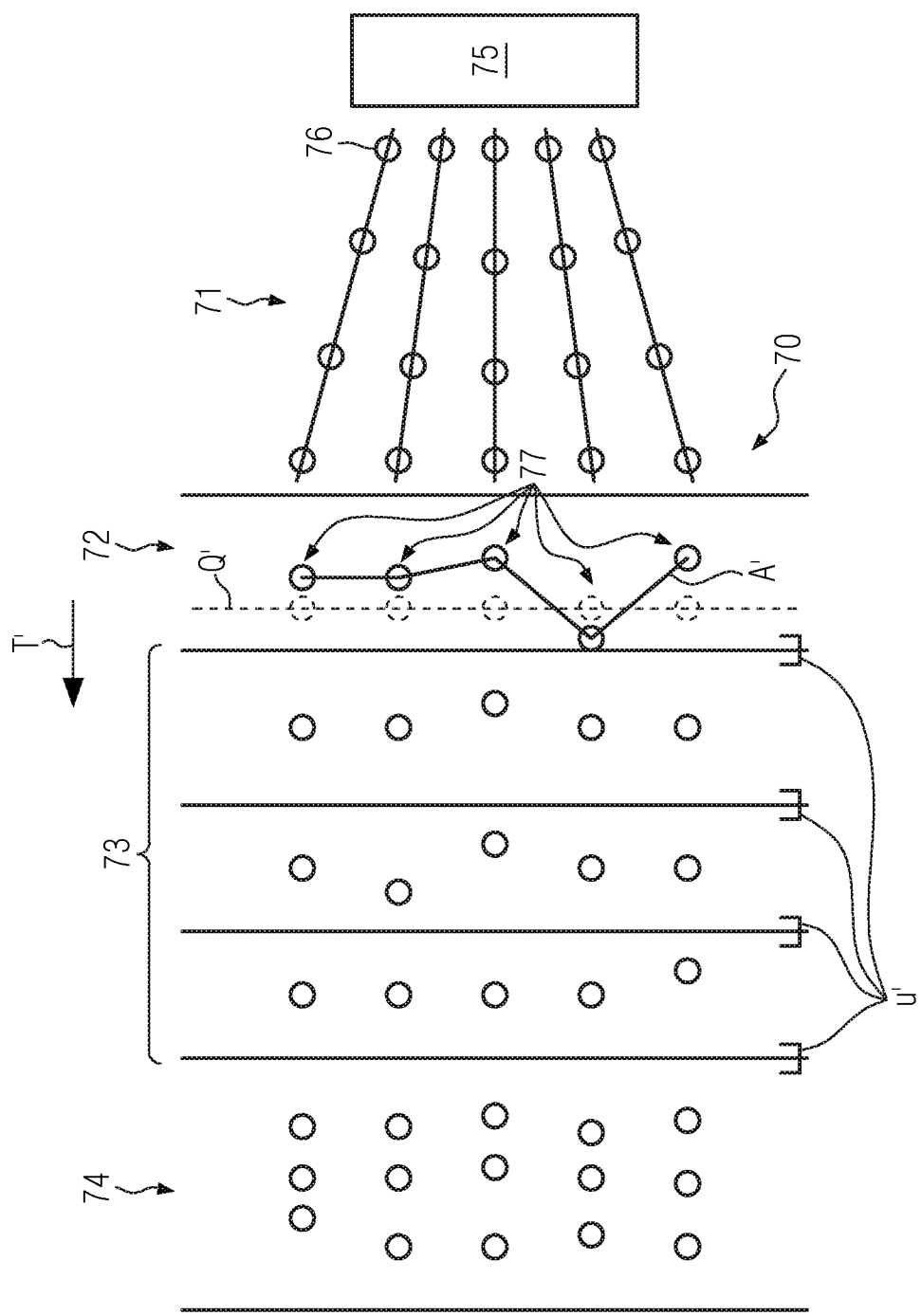
FIG. 1 shows a schematic representation of a known conveyor belt system.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a known conveyor belt system 70 described according to the introduction to the specification and having arranged therein, when seen in the conveying direction T', a distributing belt 71, an orienting belt 72, a plurality of buffer belts 73 as well as an infeed belt 74 in succession.

Upstream of the conveyor belt system 70, a slicer 75 is positioned, which continuously transfers sliced products 76 to the distributing belt 71. The distributing belt 71 distributes the initially closely spaced products 76 to a plurality of less closely spaced tracks 77 extending along the conveying direction T', so that the products 76 will be transferred according to the tracks 77 to the downstream positioned orienting belt 72. The products 76 distributed on the tracks 77 arrive on the orienting belt 72 according to an initial formation A'. On the orienting belt 72, the products 76 located thereon in the initial formation A' are accelerated such that they will be positioned according to a dashed transverse row Q', i.e. in a predetermined mode of arrangement, on the orienting belt 72 for further conveyance.

In order to allow, in the case of the arrangement shown in FIG. 1, the products 76 provided by the distributing belt 71 to be continuously fed to the orienting belt 72, the orienting belt 72 must be configured compactly, i.e. with short dimensions in the conveying direction T', because of the rapid succession of products, so that also the transverse row Q' of products 76 oriented thereby can be further conveyed rapidly.

FIG. 1 also shows that products 76 arranged according to the transverse row Q' cross, after the orienting belt 72, not only one but a plurality of buffer belts 73 on their way to the infeed belt 74. It follows that the products 76 arranged in transverse rows Q' must cross along the buffer belt line a plurality of transfer gaps U' existing between neighboring buffer belt sections as well as between the buffer belt 73 arranged last in the conveying direction T' and the subsequent infeed belt 74.

The known conveyor belt system 70 shown according to FIG. 1 has the technical disadvantage that, upon crossing the buffer belts 73 in a direction towards the infeed belt 74, the products 76, which are initially still precisely arranged according to the transverse row Q', may shift, so that downstream of the buffer belts 73, the precisely defined transverse row Q' will no longer be available for an infeed process at the infeed belt 74. The respective products 76 can then no longer be precisely placed into the packaging troughs provided.

As has already been mentioned, the orienting belt 72, which is arranged directly downstream of the distributing belt 71, is configured with short dimensions, so as to process the continuous flow of products from the distributing belt 71. In this respect, it is also disadvantageous that, in view of the comparatively short orienting times that are available for the orienting belt 72, only one transverse row Q' of products 76 at a time can be formed on the orienting belt 72, and that, in order to do so, the individual orienting belts must be highly accelerated for processing the incoming flow of products from the distributing belt 71.

Figure 2:
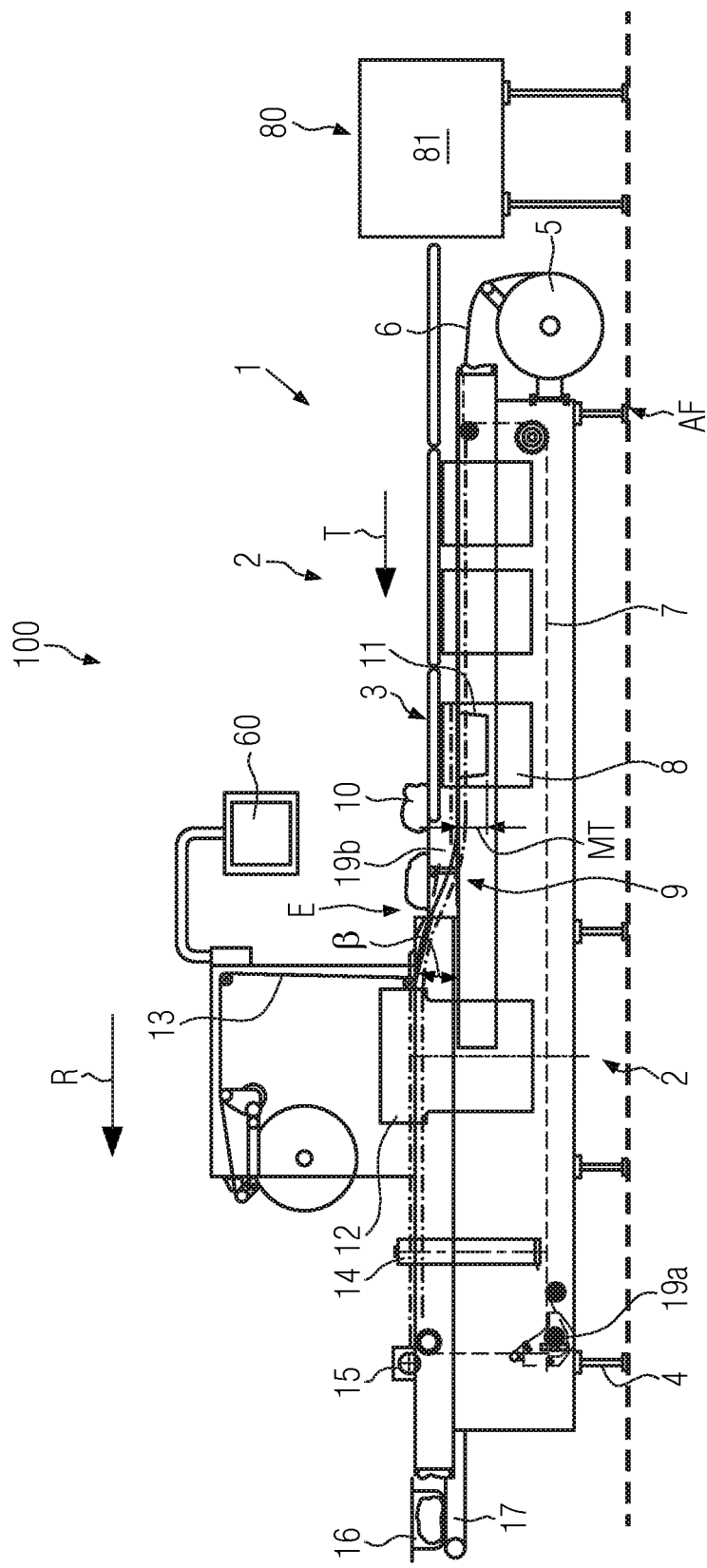
FIG. 2 shows a schematic side view of a packaging line with a packaging machine, which may be configured as a thermoform packaging machine having integrated therein a conveyor belt system for feeding products.

FIG. 2 shows a schematic side view of a packaging line 100, comprising a packaging machine 1 configured as a cyclically operating thermoform packaging machine 2 with a conveyor belt system 3. The thermoform packaging machine 2 comprises a machine frame 4 oriented along a production direction R and having a mounting surface AF on the underside thereof.

On the right hand side of the thermoform packaging machine 2 shown in FIG. 1, the conveyor belt system 3 has functionally assigned thereto a product provider 80, which is here configured e.g. as a slicer 81 and which continuously transfers to the conveyor belt system 3 products 10, separately or in respective groups, e.g. in the form of individual slices of meat or shingled slices of sausage or cheese portions, in juxtaposed product tracks.

At the beginning of the thermoform packaging machine 2, shown on the right hand side in FIG. 1, an unwinder 5 for a bottom film/foil 6 is provided. The bottom film 6 is fed to a forming station 8 by means of two clamp chains 7 arranged alongside the bottom film 6, so as to form in the bottom film 6 packaging troughs 11 with a vertical trough depth MT by thermoforming. In addition, an infeed line 9 for executing an infeed operation E of a product 10 into thermoformed packaging troughs 11 is shown downstream of the forming station 8, when seen in the production direction R, the infeed line 9 being oblique and inclined at an angle β relative to the horizontal.

In the further production process, the infeed line 9 is followed by a sealing station 12 for sealing the packaging troughs 11, which have been filled with products 10, with a cover film 13, and by a first cutting station 14 configured as a cross cutting station. A second cutting station 15, which is arranged downstream of the first cross cutting station 14, is configured as a longitudinal cutting station and separates the packages 16 from one another. Via a discharge belt 17, the separated packages 16 are conveyed out of the thermoform packaging machine 2.

The thermoform packaging machine 2 comprises a control unit 60, which is capable of controlling not only a drive 19a, e.g. a servo motor, of the clamp chains 7, but also a drive 19b of the conveyor belt system 3, so as to allow the speeds of the two drives 19a, 19b to be synchronized with, or adapted to one another, so that the infeed process can be executed optimally in accordance with the product 10 and/or the packaging trough 11.

The conveyor belt system 3 shown in FIG. 1 is preferably configured as a multi-track feed belt system for conveying products 10 along a conveying direction T. According to FIG. 1, the conveyor belt system 3 is configured as a feed belt system of the thermoform packaging machine 2, but it may also be used as a feed unit on other types of packaging machines, e.g. as a feed unit of a tray sealer.

Figure 3:
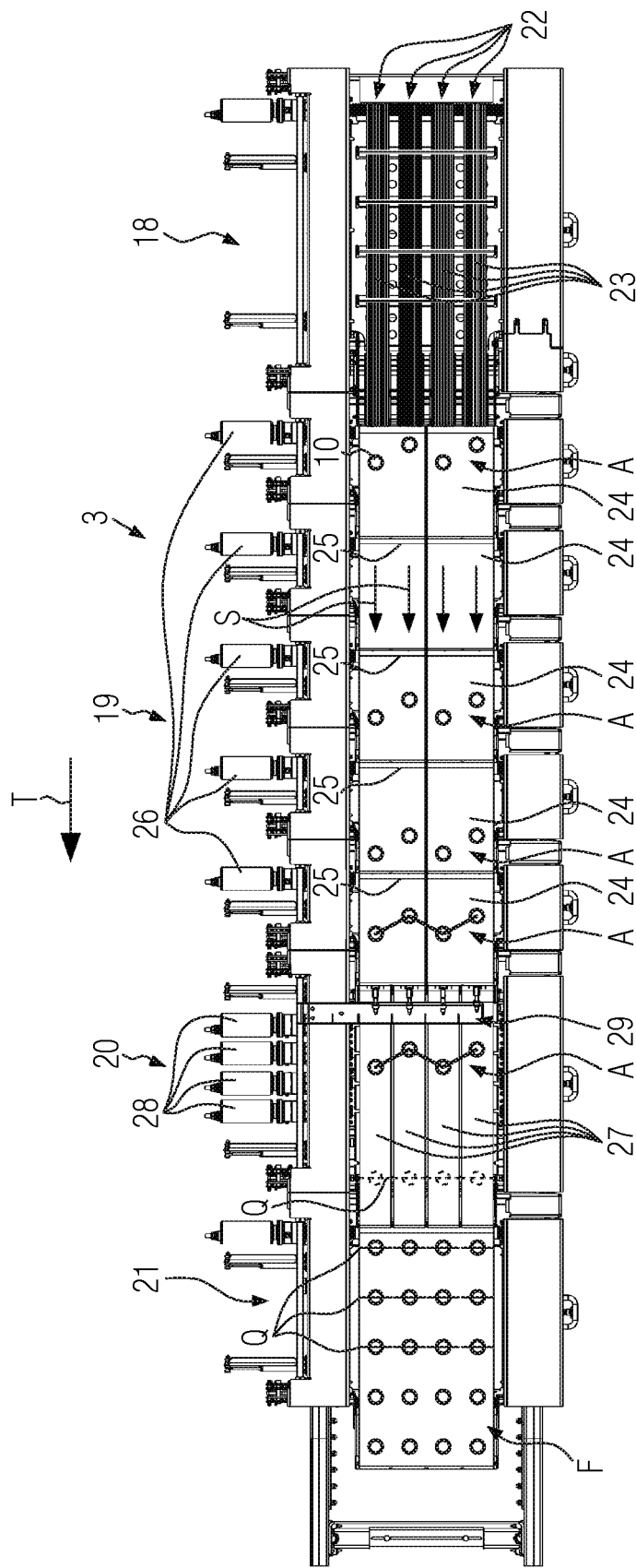
FIG. 3 shows the conveyor belt system according to the present invention, isolated in a top view.

FIG. 3 shows the conveyor belt system 3, isolated, in a top view representation. The conveyor belt system 3 comprises, in succession when seen in the conveying direction T, a distributing belt module 18, a buffer belt module 19 arranged downstream of the distributing belt module 18, an orienting belt module 20 arranged downstream of the buffer belt module 19 as well as, further downstream, an infeed belt module 21.

The distributing belt module 18 is configured for continuously taking up products from the slicer 81 shown in FIG. 2. The distributing belt module 18 comprises a plurality of distributing belts 22, which are arranged side by side when seen in the conveying direction T and which, for conveying the products 10, have conveying tracks 23 that are controllable in particular such that they diverge. The products 10 taken up from the slicer 81 may be positioned side by side closer to one another on the entrance side of the distributing belts 22 than on the discharge side of the respective distributing belts 22 (cf. FIG. 4), where they are positioned on less closely spaced tracks S for transfer to the downstream buffer belt module 19.

The buffer belt module 19 comprises, according to FIG. 3, five buffer belt sections 24 arranged one after the other when seen in the conveying direction T. Neighboring buffer belt sections 24 have formed between them a respective transfer gap 25. The respective buffer belt sections 24 are each provided with a drive 26, e.g. a servo motor. The respective drives 26 are preferably separately controllable, so that, along the buffer belt module 19, products 10 placed on the latter can be accumulated in a desired initial formation A, so that the buffer belt module 19 can, to a certain degree, be used as a pre-positioner and as a store from which the products 10 can continuously be advanced to the downstream positioned orienting belt module 20.

FIG. 3 shows that the orienting belt module 20 comprises a plurality of orienting belts 27 arranged side by side when seen in the conveying direction T. According to FIG. 3, the orienting belts 27 are separately controllable and can be accelerated such that the products 10 taken up thereon according to the initial formation A can be positioned relative to one another in a predetermined mode of arrangement F. To this end, the respective orienting belts 27 are provided with separately controllable drives 28, e.g. servo motors. According to FIG. 3, the predetermined arrangement F forms a transverse row Q relative to the conveying direction T, according to a trough format of packaging troughs 11 provided on the infeed line 9 later on.

The products 10, which have been oriented relative to one another on the orienting belt module 20 by means of the orienting belts 27, can then be transferred precisely to the infeed belt module 21 that feeds one row after the other of the products 10, which are arranged in transverse rows Q, to the infeed line 9 shown in FIG. 2. It follows that the products 10 advanced from the orienting belt module 20 and arranged precisely relative to one another only have to travel a short additional conveying distance, which does not exhibit a plurality of transfer gaps 25, towards the infeed line 9, so that they will arrive at the infeed line 9 in a precise arrangement of transverse rows Q. This makes the packaging process as a whole more precise, so that the production quality can be improved.

FIG. 3 additionally shows a detection system 29, which is arranged at the entrance of the orienting belt module 20. The detection system 29 is configured to detect the products 10 transferred to the orienting belt module 20 for forming a row Q oriented transversely to the conveying direction T, the orienting belt module 20 being configured to position the products 10, based on the values measured by the detection system 29 with respect to the products 10 located therebelow in an initial formation A, in at least one row Q transversely to the conveying direction T according to the predetermined arrangement F.

FIG. 3 shows on the orienting belt module 20, at the entrance, a plurality of products 10 positioned adjacent to one another in the initial formation A. The products 10 transferred to the orienting belt module 20 in the initial formation A are intended to be used for forming a row Q, which is oriented transversely to the conveying direction T, according to the predetermined arrangement F. A row Q, represented by a dashed line and arranged precisely transversely to the conveying direction T, is shown at the end of the orienting belt module 20 in FIG. 3. In this formation, the respective products 10 are advanced, in rows, to the downstream infeed belt module 21. The infeed belt module 21 has positioned thereon a plurality of rows Q of precisely arranged products 10, the rows Q being arranged one after the other when seen in the conveying direction T. The products 10 are fed along the infeed line 9, in accordance with the machine cycle of the thermoform packaging machine 2, to the packaging troughs 11 provided there.

On the basis of FIG. 3, it is shown that the respective products 10 intended for a row Q are first conveyed along the buffer belt module 19 according to the initial formation A arranged in a horizontal plane of projection, the respective products 10 being then also transferred to the down-stream positioned orienting belt module 20 in accordance with this initial formation A. Only after having arrived on the orienting belt module 20, which is positioned downstream of the buffer belt module 19 when seen in the conveying direction T, the products 10 are accelerated by means of the respective orienting belts 27 such that, starting from their preliminary initial formation A, they will be arranged in accordance with the desired row Q oriented transversely to the conveying direction T. This is also the formation in which they are then transferred to the downstream infeed belt module 21.

The orienting of the products 10 according to the rows Q, which, all in all, takes place with a delay along the conveying line of the conveyor belt system 3, i.e. in a delayed mode in the product conveying flow, guarantees a more precise placement of the respective products 10 into the packaging troughs 11 provided on the infeed line 9. One of the reasons for this fact is that the products 10, which have been oriented precisely in the row Q by means of the orienting belt module 20, need no longer cross the transfer gaps 25 along the conveying line of the buffer belt module 19.

Figure 4:
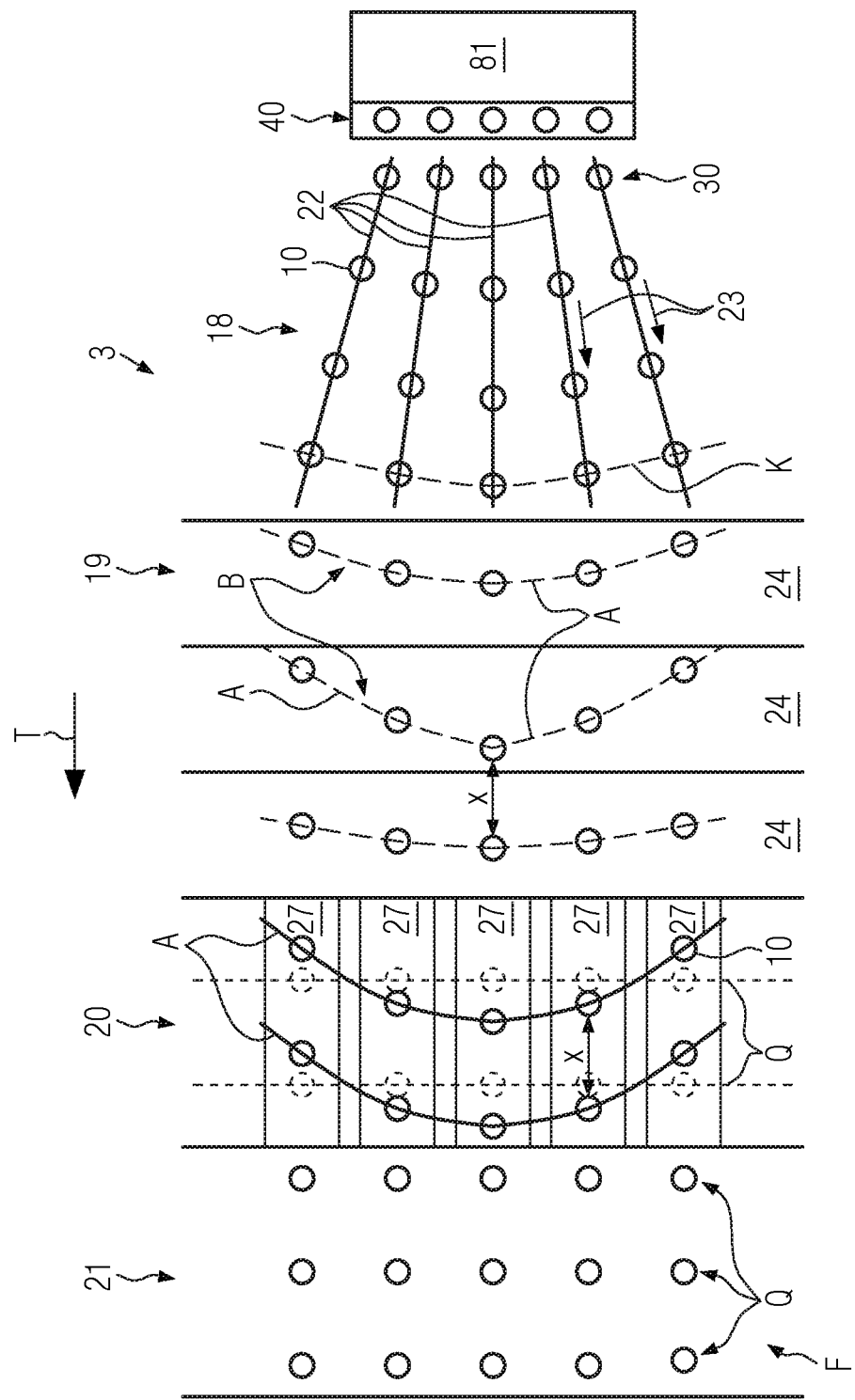
FIG. 4 shows a schematic representation of the conveyance of products along the conveyor belt system according to the present invention.

FIG. 4 shows a schematic representation of a product conveying process by means of the conveyor belt system 3. Here, the products 10 from the slicer 81 first arrive in a comparatively narrow conveying track 30 on the distributing belt module 18 in a side-by-side arrangement. Making use of the distributing belts 22, the products 10, which have first been taken up from the slicer 81 in narrow tracks, are conveyed towards the buffer belt module 19 along the tracks 23 that are controllable such that they diverge. The respective products 10 provided for a row Q are transferred to the distributing belt module 18 according to the initial formation A.

In FIG. 4 the products 10 coming from the slicer 81 are guided along the tracks 23 such that the respective products 10 provided for a row Q are conveyed transversely to the conveying direction T in substantially concentric curves K towards the buffer belt module 19. Along the buffer belt module 19, the respective products 10 intended for a row Q are arranged transversely to the conveying direction T in a plurality of curved lines B, which are oriented such that they follow one after the other, as initial formation A. Along the conveying line of the buffer belt module 19, the respective products 10, conveyed in curved lines B that follow one after the other, may catch up with one another according to a predetermined distance X, so that, prior to the transfer to the orienting belt module 20, a predetermined pre-accumulation or pre-arrangement of the respective products 10 will take place on the buffer belt module 19.

FIG. 4 shows schematically that a plurality of products 10 is positioned on the orienting belt module 20. The products 10 provided for a row Q are initially arranged according to an initial formation A, here in two curved lines B positioned one after the other. The respective orienting belts 27 can now be accelerated independently of one another such that it is possible to produce even two rows Q, which are arranged transversely to the conveying direction T one after the other with a predetermined distance X therebetween and which comprise precisely arranged products 10.

Likewise, it would also be possible that only one row Q of products 10 is oriented transversely to the conveying direction T on the orienting belt module 20. This would be of advantage, if the buffer belt module 19 would not provide the products 10 to the orienting belt module 20 in initial formations A that are uniformly arranged one after the other. If, however, the products 10 can be conveyed along the buffer belt module towards the orienting belt module 20 in initial formations A that are uniformly arranged one after the other, it is possible to produce even a plurality of rows Q on the orienting belt module 20.

Since the products 10 conveyed on the buffer belt module 19 can be accumulated along the latter, the downstream orienting belt module 20 has, all in all, more time to precisely arrange the products 10 positioned thereon. As a result, it will also be possible that a product charging or recharging process at the slicer 81 can be compensated for more effectively.

According to FIG. 4, a discarding belt module 40 is positioned to the left of the slicer 81, the dis-carding belt module 40 being configured to discard the products 10 and/or groups of products 10 which have a predetermined property, e.g. which do not have the target weight.

The present invention offers an improved conveyance of products, which are provided individually or in respective groups, for a precise transfer of these products to a downstream working process, e.g. an infeed process on a thermoform packaging machine. According to the present invention, the respective products are, along the conveying line, first distributed, then buffered and accumulated and only subsequently oriented in a predetermined arrangement, so that the products oriented in a desired format can be supplied precisely to a subsequent infeed process. The principle according to the present invention can easily be applied to different types of pack-aging machines and results, all in all, in an improvement of the packaging quality.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A conveyor belt system configured for forming a predetermined arrangement of a plurality of products provided individually or in respective groups, the conveyor belt system comprising:
    a distributing belt module which takes up the plurality of products from an upstream positioned product provider;
    a buffer belt module arranged downstream of the distributing belt module, the buffer belt module configured to convey the plurality of products one after the other in a conveying direction in a plurality of tracks extending side by side; and
    an orienting belt module controllable such that the orienting belt positions the plurality of products thereon in at least one row orientated transverse to the conveying direction according to the predetermined arrangement;
    wherein the orienting belt module is positioned further downstream than the buffer belt module in the conveying direction; and
    wherein the orienting belt module comprises a plurality of independently operating orienting belts disposed side by side in a direction perpendicular to the conveying direction, the respective plurality of orienting belts are independently accelerable such that the products placed thereon are positionable relative to one another in said at least one row of products.

2. The conveyor belt system according to claim 1, wherein the buffer belt module comprises a plurality of separately controllable buffer belt sections arranged one after the other in the conveying direction, wherein adjacent buffer belt sections are separated from one another by a transfer gap.

3. The conveyor belt system according to claim 1, wherein the products intended for a row according to the predetermined arrangement are first transferred from the buffer belt module to the orienting belt module according to an initial formation arranged in a horizontal plane of projection.

4. The conveyor belt system according to claim 1, wherein the plurality of products intended for the respective row according to the predetermined arrangement are transferred from the buffer belt module to the orienting belt module in a respective initial formation which is arranged in a similar manner one after the other.

5. The conveyor belt system according to claim 1, wherein a number of the orienting belts positioned side by side corresponds to a number of the plurality of tracks of products oriented in the conveying direction within the predetermined arrangement.

6. The conveyor belt system according to claim 1 further comprising an infeed belt module arranged downstream of the orienting belt module in the conveying direction and used for filling packaging troughs provided for an infeed process.

7. The conveyor belt system according to claim 1, wherein the orienting belt module is an infeed belt for filling one or more packaging troughs provided for an infeed process.

8. The conveyor belt system according to claim 1, wherein the distributing belt module comprises a plurality of distributing belts arranged side by side in the conveying direction and having conveying tracks which are controllable such that the conveying tracks diverge in the production direction.

9. The conveyor belt system according to claim 1, further comprising a discarding belt module configured for discarding one or more of the plurality of products and/or groups of the plurality of products which have a predetermined property.

10. The conveyor belt system according to claim 1, wherein the orienting belt module has associated therewith a detection system that is configured to detect the plurality of products transferred to the orienting belt module for forming a row oriented transverse to the conveying direction, wherein the orienting belt module is configured for positioning the plurality of products based on values measured by the detection system, the plurality of products being located on the orientating belt in an initial formation and in at least one row orientated transversely to the conveying direction according to the predetermined arrangement.

11. A packaging machine comprising the conveyor belt system of claim 1 wherein the conveyor belt system precedes an infeed process of the packaging machine.

12. A packaging line comprising the packaging machine of claim 11 and a slicer associated with the packaging machine, the slicer producing the plurality of products, wherein the plurality of products comprise sliced individual and/or grouped products, and wherein the packaging machine is a thermoform packaging machine.

13. A method of forming a predetermined arrangement from products provided individually or in groups, the method comprising:

determining a predetermined arrangement of a plurality of products for an infeed process of a packaging machine;

conveying the plurality of products along a first conveying section, wherein the plurality of products are distributed to a plurality of pre-determined tracks extending in a conveying direction;

conveying the plurality of products along a second conveying section in a plurality of initial formations that are arranged in a similar manner one after the other in the conveying direction, wherein the plurality of products are intended for a row that is oriented transverse to the conveying direction and the row comprises at least a part of the predetermined arrangement;

conveying the plurality of products along a third conveying section, the plurality of products provided according to at least one of the plurality of initial formations; and accelerating of one or more of the plurality of products relative to one or more of the other products in the plurality of the products on the third conveying system to position each of the plurality of products in at least one row according to the predetermined arrangement, the row being oriented transversely to the conveying direction.

* * * * *